(12) United States Patent
Itoh

(10) Patent No.: US 9,253,475 B2
(45) Date of Patent: Feb. 2, 2016

(54) DISPLAY DEVICE

(75) Inventor: Tatsuo Itoh, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 490 days.

(21) Appl. No.: 13/806,285

(22) PCT Filed: Apr. 23, 2012

(86) PCT No.: PCT/JP2012/002774
§ 371 (c)(1),
(2), (4) Date: Dec. 21, 2012

(87) PCT Pub. No.: WO2012/147328
PCT Pub. Date: Nov. 1, 2012

(65) Prior Publication Data
US 2013/0093861 A1  Apr. 18, 2013

(30) Foreign Application Priority Data

Apr. 27, 2011  (JP) .................................. 2011-099621

(51) Int. Cl.
*G02B 27/22* (2006.01)
*G02B 3/06* (2006.01)
(Continued)

(52) U.S. Cl.
CPC .............. *H04N 13/0402* (2013.01); *G02B 3/06* (2013.01); *G02B 27/2214* (2013.01); *G03B 21/2033* (2013.01); *G03B 25/02* (2013.01); *G03B 35/24* (2013.01); *H04N 13/0418* (2013.01); *H04N 13/0468* (2013.01)

(58) Field of Classification Search
None
See application file for complete search history.

(56) References Cited

U.S. PATENT DOCUMENTS 6,744,557 B1   6/2004  Chen
7,144,117 B2  12/2006  Kojima
(Continued)

FOREIGN PATENT DOCUMENTS

CN    1372649      10/2002
CN  101888481      11/2010
(Continued)

OTHER PUBLICATIONS

International Search Report issued Jun. 12, 2012 in International (PCT) Application No. PCT/JP2012/002774.
(Continued)

*Primary Examiner* — Jay Patel
*Assistant Examiner* — Reza Aghevli
(74) *Attorney, Agent, or Firm* — Wenderoth, Lind & Ponack, L.L.P.

(57) ABSTRACT

A display device that displays an image, includes: a light source; an aperture stop array including a plurality of aperture stops; a lens array including a plurality of lenses which are disposed corresponding to the plurality of aperture stops respectively, and focus the light transmitted through the plurality of aperture stops respectively; a deflecting unit deflecting a travelling direction of the focused light respectively; a spatial light modulator that is illuminated by the deflected light, and modulates the illumination light; a detector that detects an observer; and a controller that calculates a position of a pupil of the observer based on a detection result by the detector, calculates a relative position of the display device and the pupil of the observer based on the calculation result, and controls an aperture amount of the plurality of aperture stops and a deflecting amount of the deflecting unit based on this calculation result.

11 Claims, 12 Drawing Sheets

(51) Int. Cl.
  *G03B 21/20* (2006.01)
  *H04N 13/04* (2006.01)
  *G03B 25/02* (2006.01)
  *G03B 35/24* (2006.01)

(56) References Cited

U.S. PATENT DOCUMENTS

| | | | |
|---|---|---|---|
| 7,425,069 B2 | 9/2008 | Schwerdtner et al. | |
| 7,482,566 B2* | 1/2009 | Olszak | 250/205 |
| 7,535,607 B2* | 5/2009 | Schwerdtner et al. | 359/9 |
| 7,609,445 B2* | 10/2009 | Hamagishi | 359/463 |
| 8,462,408 B2* | 6/2013 | Kroll et al. | 359/9 |
| 2005/0035943 A1 | 2/2005 | Kojima | |
| 2006/0209371 A1 | 9/2006 | Hamagishi | |
| 2006/0279567 A1* | 12/2006 | Schwerdtner et al. | 345/419 |
| 2008/0212153 A1* | 9/2008 | Haussler et al. | 359/32 |
| 2010/0149139 A1* | 6/2010 | Kroll et al. | 345/204 |
| 2010/0157026 A1* | 6/2010 | Reichelt | 348/51 |
| 2010/0214634 A1 | 8/2010 | Kroll et al. | |
| 2010/0259604 A1 | 10/2010 | Surman | |
| 2010/0283863 A1 | 11/2010 | Yamamoto | |
| 2011/0043768 A1 | 2/2011 | Nakayama et al. | |

FOREIGN PATENT DOCUMENTS

| | | |
|---|---|---|
| CN | 102016692 | 4/2011 |
| JP | 11-234705 | 8/1999 |
| JP | 2005-31526 | 2/2005 |
| JP | 2006-259191 | 9/2006 |
| JP | 2007-503606 | 2/2007 |
| JP | 2007-67417 | 3/2007 |
| JP | 2010-113160 | 5/2010 |
| JP | 2010-528331 | 8/2010 |
| WO | 2010/115235 | 10/2010 |

OTHER PUBLICATIONS

Office Action issued Dec. 16, 2014 in corresponding Chinese Application No. 201280001802.3, with English translation.

* cited by examiner

DISPLAY DEVICE

TECHNICAL FIELD

The present invention relates to a display device that displays an image in use of light from a laser, light emitting diode, or the like.

BACKGROUND ART

Recently development of a display device using three primary color laser light is progressing because of good color reproducibility and low power consumption. A laser light, on the other hand, is a monochromatic light, and wavefronts are coherent, hence if a laser is focused on one point of a retina when it enters a human eye, the retina may receive negative influence. Therefore, with respect to products that use a laser light, based on International Standard IEC 60825, or JIS C6802:2005 in Japan, laser products are classified and guidelines are provided for each class that manufacturers and users should adhere to, and only a laser product that conforms to the standard is manufactured.

According to JIS C6802:2005, a term maximum permissible exposure (MPE) is specified, and the level of laser radiation, which does not cause undesirable influence on the human body, even if the human body is exposed to radiation under a normal environment, is designated using the laser wavelength, size of light source, exposure time, tissue exposed to a laser light, laser pulse width or the like as parameters. Manufacturers of laser products have the duty to produce laser products strictly adhering to these standards.

An example of a display device using a laser light is a display device which can perform stereoscopic display to the naked eye (e.g. see Patent Document 1). Configuration and principle of the display device using a laser light will now be described with reference to drawings.

FIG. 11 is a perspective view depicting a conventional display device. A laser light emitted from a laser light source 103 enters a side face of a light guiding plate 102 via an optical fiber 104, is diffused in the light guiding plate 102, and is emitted approximately in the vertical direction from a principal plane of the light guiding plate 102. A deflecting unit 105 deflects a traveling direction of the laser light emitted from the light guiding plate 102, and causes the laser light to enter a liquid crystal panel 101. The liquid crystal panel 101 is controlled by a controller 107 and modulates the laser light according to an image signal to be displayed. A stereo camera 106 captures an image of an observer (not illustrated) who observes the liquid crystal panel 101.

The controller 107 recognizes a relative positional relationship of the pupils of the observer and the display device based on an image captured by the stereo camera 106. After recognizing the positions of the pupils of the observer, the controller 107 controls the deflecting unit 105 so that the laser light transmitted through the liquid crystal panel 101 enters only the right eye of the observer in a state where a parallax image for the right eye is displayed on the liquid crystal panel 101. Then the controller 107 controls the deflecting unit 105 so that the laser light transmitted through the liquid crystal panel 101 enters only the left eye of the observer in a state where a parallax image for the left eye is displayed on the liquid crystal panel 101. A stereoscopic display is implemented by repeating the cycle for the left eye and the right eye as described above. If a same image is displayed for the left eye and the right eye, an ordinary display device that displays plane images is implemented.

FIGS. 12A and 12B are cross-sectional views sectioned at the B-B line in FIG. 11. In FIGS. 12A and 12B, a same composing element as FIG. 11 is denoted with a same reference numeral, for which description is omitted. In FIG. 12A, a laser light 108 (solid line) emitted from the light guiding plate 102 is deflected in the traveling direction by the deflecting unit 105, transmits through the liquid crystal panel 101 and enters one pupil (pupil 110L of the left eye in FIG. 12A) of the observer. The laser light 109 (dotted line) is also deflected in the traveling direction by the deflecting unit 105, transmits through the liquid crystal panel 101 and enters the one pupil (pupil 110L of the left eye in FIG. 12A) of the observer.

As shown with the solid line (laser light 108) and the dotted line (laser light 109) in FIG. 12A, each laser light that transmits through different areas of the liquid crystal panel 101 is deflected in different directions, and is controlled to enter one pupil (pupil 110L of the left eye in FIG. 12A) of the observer. The laser light that transmits through the liquid crystal panel 101 is a diffused light, and an image can be recognized by observing the diffused light that transmits through each pixel of the liquid crystal panel 101. In other words, as FIG. 12A shows, the laser light that transmits through each pixel of the liquid crystal panel 101 spreads somewhat when it reaches the pupil.

Patent Document 1: US Patent Application Publication No. 2010/0259604

SUMMARY OF INVENTION

In a conventional display device, the laser light that transmits through each pixel of the liquid crystal panel 101 is diffused light, as described above. Therefore when the distance between the display device and the observer is long, as shown in FIG. 12B, a phenomenon arises that the laser light 108 and 109, which should enter only one pupil 110L, enter the other pupil 110R as well. This phenomenon causes two problems.

The first problem is crosstalk. Stereoscopic vision is interrupted by the parallax image for the right eye entering the left eye as well, and vice versa. As a result, it becomes impossible for the observer to recognize a desired image. The second problem is the decrease in light use efficiency. Light that does not enter the pupil of the observer is not utilized and is lost. Therefore, when the distance between the observer and the display device increases, and the spread of the diffused light increases at a position where the observer exists, light use efficiency decreases.

With the foregoing in view, it is an object of the present invention to provide a display device which can prevent a decrease in light use efficiency, and cause the observer to visually recognize a desired image.

A display device according to the present invention is a display device that displays an image, comprising: a light source that emits light; an aperture stop array that includes a plurality of aperture stops which respectively limit a transmission range of the light; a lens array that includes a plurality of lenses which are disposed corresponding to the plurality of aperture stops respectively, and focus the light transmitted through the plurality of aperture stops respectively; a deflecting unit that deflects a travelling direction of the light focused by the plurality of lenses respectively; a spatial light modulator that is illuminated by the light deflected by the deflecting unit, and modulates the illumination light; a detector that detects an observer who observes the spatial light modulator; and a controller that calculates a position of a pupil of the observer based on a detection result by the detector, calculates a relative position of the display device and the pupil of the observer based on the calculation result, and controls an aperture amount of the plurality of aperture stops and a deflecting amount of the deflecting unit based on this calculation result.

According to the present invention, a display device which can prevent a drop in light use efficiency, regardless the distance between the display device and the observer, and cause the observer to visually recognize a desired image, can be implemented.

DESCRIPTION OF EMBODIMENTS

Embodiments will now be described with reference to the drawings.

Embodiment 1

Figure 1:
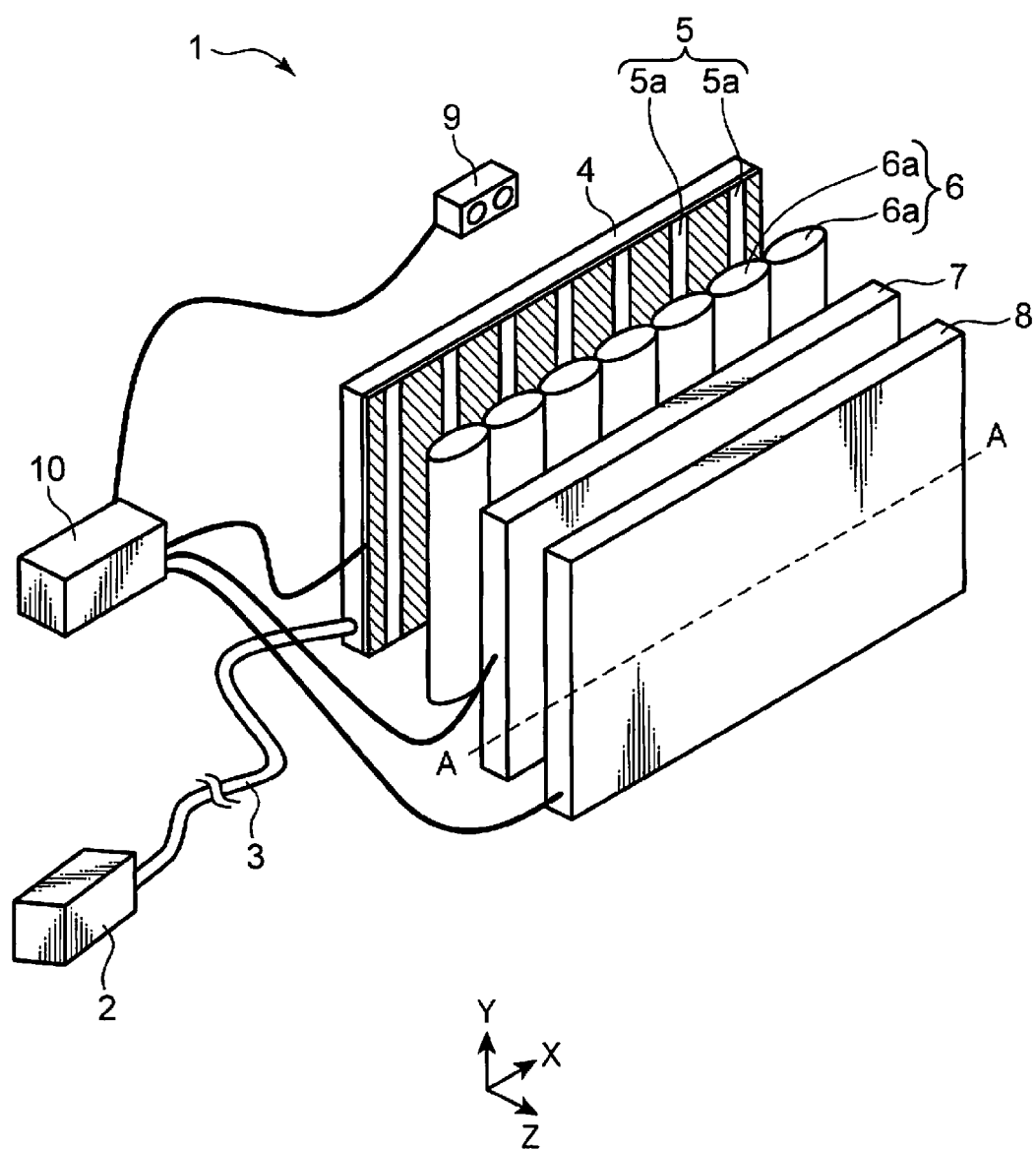
FIG. 1 is a perspective view depicting a configuration of a display device according to Embodiment 1.

FIG. 1 is a perspective view depicting a configuration of a display device 1 according to Embodiment 1. The display device 1 illustrated in FIG. 1 has a laser light source 2, an optical fiber 3, a light guiding plate 4, an aperture stop array 5, a lens array 6, a deflecting unit 7, a liquid crystal panel 8, a stereo camera 9 and a controller 10. The laser light source 2 emits laser light. Both ends of the optical fiber 3 are connected to the laser light source 2 and a side face of the light guiding plate 4 respectively. The optical fiber 3 guides the laser light emitted from the laser light source 2 to the light guiding plate 4. The light guiding plate 4 has the side face connected with the optical fiber 3, and a principal plane that is vertical to the side face. The laser light which enters the side face of the light guiding plate 4 is diffused inside the light guiding plate 4, and is emitted from the principal plane of the light guiding plate 4 substantially in a vertical direction to the principal plane.

The aperture stop array 5 is disposed contacting to or close to the principal plane of the light guiding plate 4, and is constituted by a liquid crystal panel, in the case of Embodiment 1 for example. The aperture stop array 5 includes a plurality of aperture stops 5a, and limits the transmission range of the light emitted from the light guiding plate 4. The aperture stop array 5 is configured to be able to control the position and the aperture amount of the aperture stop 5a. In FIG. 1, the aperture stop 5a of the aperture stop array 5 is indicated in white, and a shielded area other than the aperture stop 5a is shaded. The shielded area of the aperture stop array 5 reflects the light emitted from the light guiding plate 4 to return the light to the light guiding plate 4.

In Embodiment 1, the lens array 6 includes a plurality of cylindrical lenses (hereafter simply called "lenses") 6a. The plurality of lenses 6a are disposed so as to correspond to the plurality of aperture stops 5a of the aperture stop array 5 respectively. Each lens 6a focuses the light transmitted through each aperture stop 5a of the aperture stop array 5 respectively. The deflecting unit 7 has a principal plane on the lens array 6 side, and the other principal plane facing this principal plane. The deflecting unit 7 deflects the travelling direction of the light which enters through the principal plane on the lens array 6 side, and emits the deflected light through the other principal plane to cause the light to enter the liquid crystal panel 8.

The liquid crystal panel 8, which is controlled by the controller 10, modulates the laser light which enters from the deflecting unit 7 by changing the transmittance of each pixel according to the image information to be displayed. The stereo camera 9, which is controlled by the controller 10, captures an image of an area in front of the liquid crystal panel 8 to detect an observer (not illustrated) who observes the liquid crystal panel 8.

The controller 10 controls operation of each component of the display device 1. The controller 10 has, for example, a central processing unit (CPU), a read only memory (ROM), a random access memory (RAM) and the like. The controller 10 functions as follows by the CPU executing programs stored in the ROM.

The controller 10 controls the position and aperture amount of the aperture stop 5a by controlling the voltage applied to the aperture stop array 5. The controller 10 controls the transmittance of each pixel of the liquid crystal panel 8. The controller 10 recognizes the relative positional relationship between the pupils of the observer and the display device 1 based on the observer detected in the image captured by the stereo camera 9. In concrete terms, the controller 10 calculates positions of the pupils of the observer with respect to the display device 1, a distance between the display device 1 and each pupil of the observer, and the like. The controller 10 may detect a head of an observer, for example, in the image captured by the stereo camera 9, and estimate the positions of pupils of the left and right eyes based on the detected form of the head. Alternatively, the controller 10 may detect the positions of the pupils of the left and right eyes directly, by performing image processing on the image captured by the stereo camera 9.

In order to display a stereoscopic image, the controller 10, after recognizing the pupil positions of the observer, controls the deflecting amount of the deflecting unit 7, so that the laser light transmitted through the liquid crystal panel 8 enters only the pupil 11Ra of the right eye 11R of the observer (FIG. 2) in a state of displaying a parallax image for the right eye on the liquid crystal panel 8. Then the controller 10 controls the deflecting amount of the deflecting unit 7, so that the laser light transmitted through the liquid crystal panel 8 enters only the pupil 11La of the left eye 11L of the observer (FIG. 2) in a state of displaying a parallax image for the left eye on the liquid crystal panel 8. The stereoscopic image is displayed on the liquid crystal panel 8 by the controller 10 repeating the cycle for the left eye and the right eye.

If a same image is displayed for the left eye and the right eye, an ordinary display device, where a plane image is displayed on the liquid crystal panel 8, is implemented. The functions of the controller 10 will be described in more detail later. In this embodiment, the laser light source 2 corresponds to an example of the light source, the liquid crystal panel 8 corresponds to an example of the spatial light modulator, and the stereo camera 9 corresponds to an example of the detector.

Figure 2:
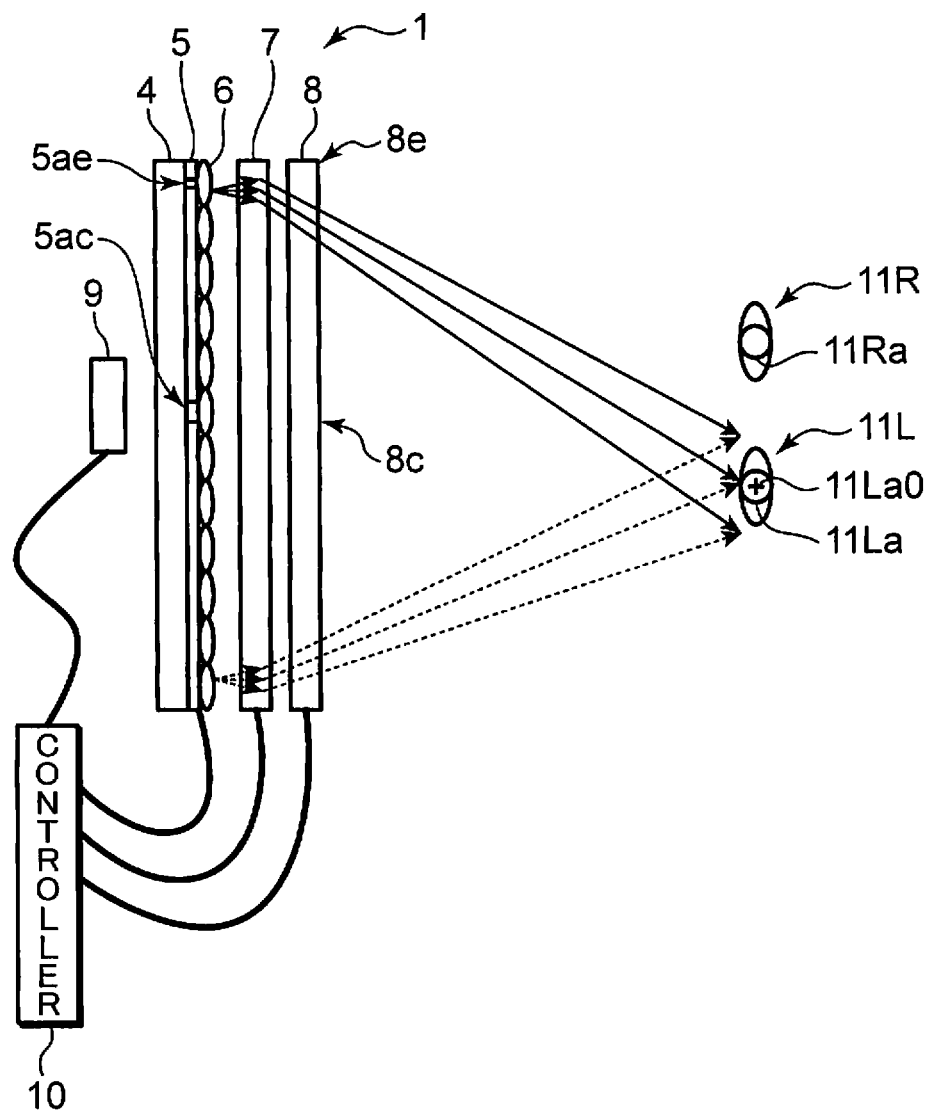
FIG. 2 is a cross-sectional view of the display device sectioned in the A-A line in FIG. 1.
Figure 3:
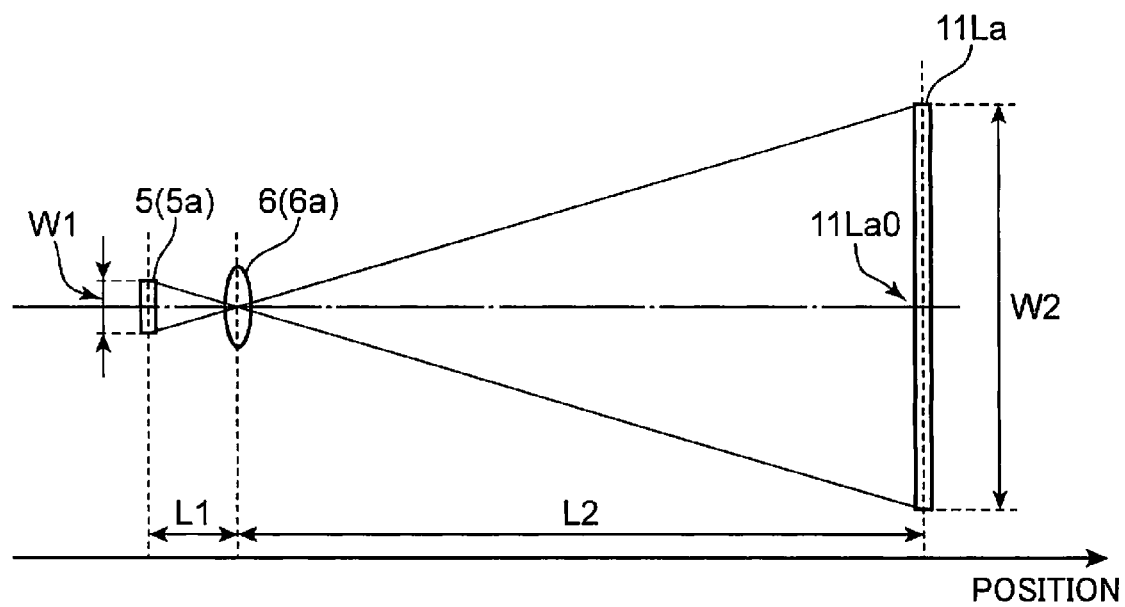
FIG. 3 is a schematic diagram depicting a relative positional relationship among an aperture stop array, a lens array and a pupil of an observer.

FIG. 2 is a cross-sectional view of the display device 1 sectioned in the A-A line in FIG. 1. FIG. 3 is a schematic diagram depicting a relative positional relationship among the aperture stop array 5, the lens array 6 and a pupil 11La of the observer. In FIG. 2 and FIG. 3, a same composing element as FIG. 1 is denoted with a same reference numeral, for which description is omitted. In the display device 1 in FIG. 2, when an observer is detected by the stereo camera 9, the controller 10 calculates a relative positional relationship between the liquid crystal panel 8 and the pupil 11La of the left eye 11L, and the pupil 11Ra of the right eye 11R of the observer (that is, position, distance etc. of the pupils 11La and 11Ra with respect to the liquid crystal panel 8), based on the detection signal from the stereo camera 9. Based on the calculated result, the controller 10 controls the deflecting amount of the deflecting unit 7 to control the direction of the laser light that transmits through the liquid crystal panel 8, so as to be directed to one pupil (e.g. pupil 11La of the left eye 11L) of the observer. In Embodiment 1, it is assumed that a position of a pupil is a position of the center of a pupil. For example, the position of the pupil 11La of the left eye 11L is the position of the center 11La0 of the pupil 11La.

Here according to Embodiment 1, the controller 10 controls the aperture amount of the aperture stop 5a of the aperture stop array 5, so that the laser light spreads to a size similar to the diameter of the pupil, for example, at the position of the pupil of the observer. More specifically, the aperture stop array 5 and the pupil 11La of the observer are in conjugate positions with respect to the lens array 6 in FIG. 2. Here it is assumed that, as FIG. 3 illustrates, W1 is an aperture amount (aperture width) of the aperture stop 5a of the aperture stop array 5, L1 is a distance between the aperture stop array 5 and the lens array 6, W2 is a diameter of the pupil 11La, and L2 is a distance between the lens array 6 and the pupil 11La. In this case, according to Embodiment 1, the controller 10 controls the aperture amount (aperture width) W1 of the aperture stop 5a of the aperture stop array 5, so as to satisfy the relational expression (1):

$$W1 \times L2 = W2 \times L1 \qquad (1).$$

As a result, the light that transmits through the aperture stop 5a of the aperture stop array 5 enters the pupil 11La without loss. The controller 10 can hold the standard diameter of a human pupil in advance as the diameter W2.

As is clear from FIG. 2, the distance L2 between the lens array 6 and the pupil 11La is different depending on whether the lens is facing the edge 8e or the center 8c of the liquid crystal panel 8. In other words, compared with a lens facing an area near the center 8c of the liquid crystal panel 8, the distance L2 is longer for a lens facing an area near the edge 8e of the liquid crystal panel 8. Therefore the controller 10 may change the aperture amount W1 of the aperture stop 5a of the aperture stop array 5 in accordance with a facing position on the liquid crystal panel 8 (that is, distance between a lens 6a corresponding to the aperture stop 5a and the pupil 11La). In concrete terms, the controller 10 may decrease the aperture amount W1 of the aperture stop 5ae facing an area near the edge 8e of the liquid crystal panel 8, compared with the aperture amount W1 of the aperture stop 5ac facing an area near the center 8c of the liquid crystal panel 8.

Thus, in Embodiment 1, the controller 10 calculates the relative positional relationship between the liquid crystal panel 8 and both pupils of the observer, and controls the deflecting amount of the deflecting unit 7 based on the calculated result, so that the laser light is directed to the pupil of the right eye of the observer when an image for the right eye is displayed on the liquid crystal panel 8, and is directed to the pupil of the left eye of the observer when an image for the left eye is displayed on the liquid crystal panel 8 respectively. Further, the controller 10 controls the aperture amount of the aperture stop 5a of the aperture stop array 5 in accordance with the distance L2 between the pupil of the observer and the lens array 6. Thereby the laser light reaches only one pupil of the observer without loss. As a result, according to Embodiment 1, a display device 1 with little crosstalk and high light use efficiency can be implemented.

As described above, the controller 10 holds the standard diameter of the size of a human pupil in advance as a diameter W2. However, from FIG. 3, one can see that an optimum value of the aperture width W1 of the aperture stop 5a of the aperture stop array 5 changes depending not only on the distance L2 between the lens array 6 and the pupil 11La, but also on the diameter W2 of the pupil 11La. Therefore in Embodiment 1, the aperture width W1 (aperture amount) of the aperture stop 5a of the aperture stop array 5 may also be controlled in accordance with the diameter of the pupil of the observer.

Figure 4:
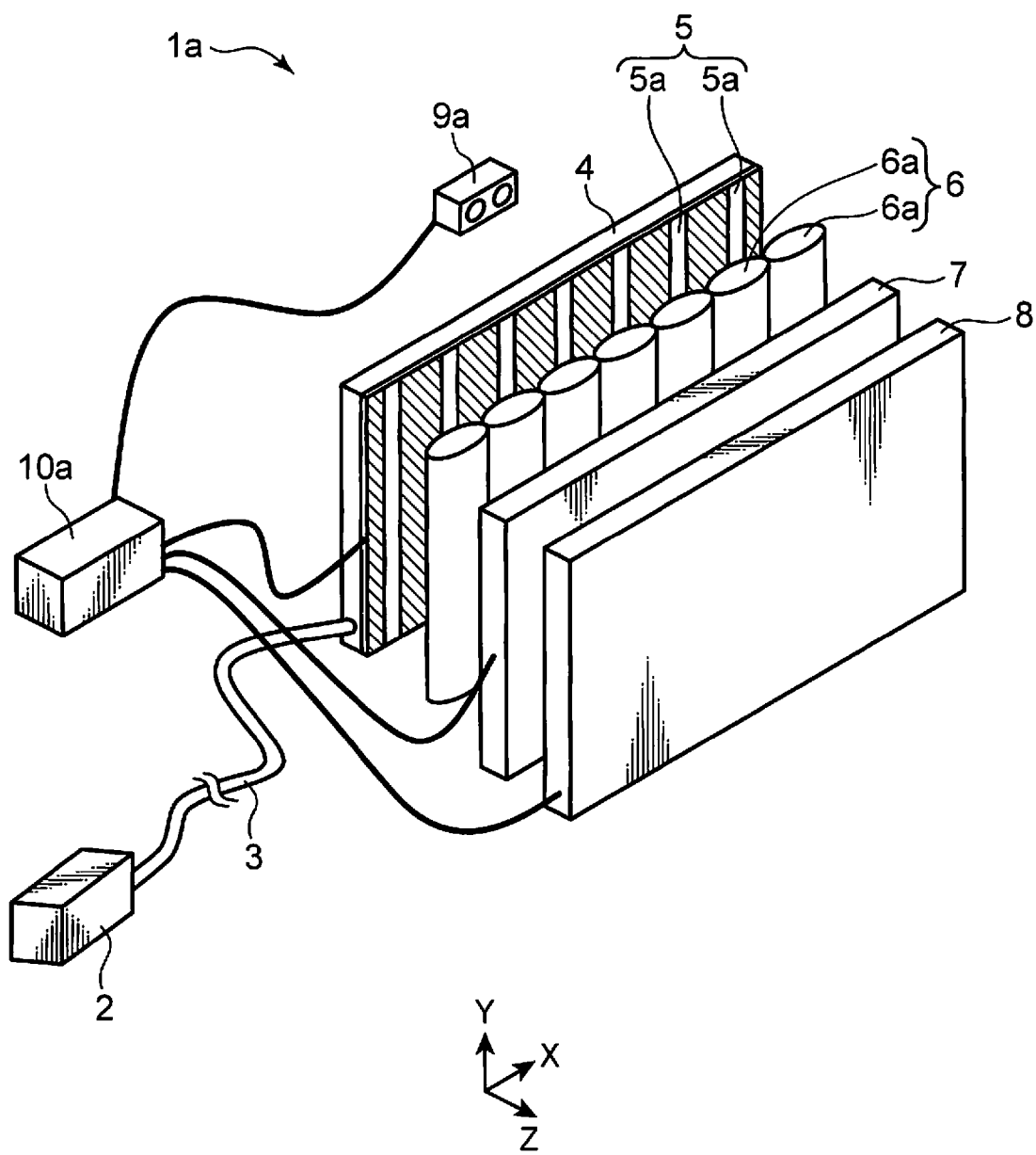
FIG. 4 is a perspective view depicting a configuration of a display device according to a modified embodiment of Embodiment 1.

FIG. 4 is a perspective view depicting a configuration of a display device 1a according to a modified embodiment of Embodiment 1. In FIG. 4, a composing element the same as FIG. 1 is denoted with a same reference symbol. The display device 1a illustrated in FIG. 4 has a stereo camera 9a, instead of the stereo camera 9, and has a controller 10a, instead of the controller 10. The modified embodiment illustrated in FIG. 4 will now be described focusing on the differences from Embodiment 1.

The stereo camera 9a has a function to detect a degree of the opening of the pupil of the observer. The stereo camera 9a emits light, such as infrared light for instance, and receives reflected light of the emitted light. The stereo camera 9a detects a diameter of the pupil of the observer, based on the fact that light is not reflected from the pupil of the iris. Based on the pupil of the observer, the lens array 6 and the diameter of the pupil of the observer detected by the stereo camera 9a, the controller 10a controls the aperture width W1 (aperture amount) of the aperture stop 5a of the aperture stop array 5, using the above-described expression (1), for example. Therefore, the laser light can enter the pupil with certainty without loss. According to the embodiment illustrated in FIG. 4, the display device 1a, of which light use efficiency is improved even more so than Embodiment 1, can be implemented.

Although the diameter of the pupil is detected by the stereo camera 9a in FIG. 4, the present invention is not limited to this. Generally the pupil opens in the dark, and closes in brightness. Hence the diameter of the pupil may be estimated based on the ambient brightness of the display device.

Figure 5:
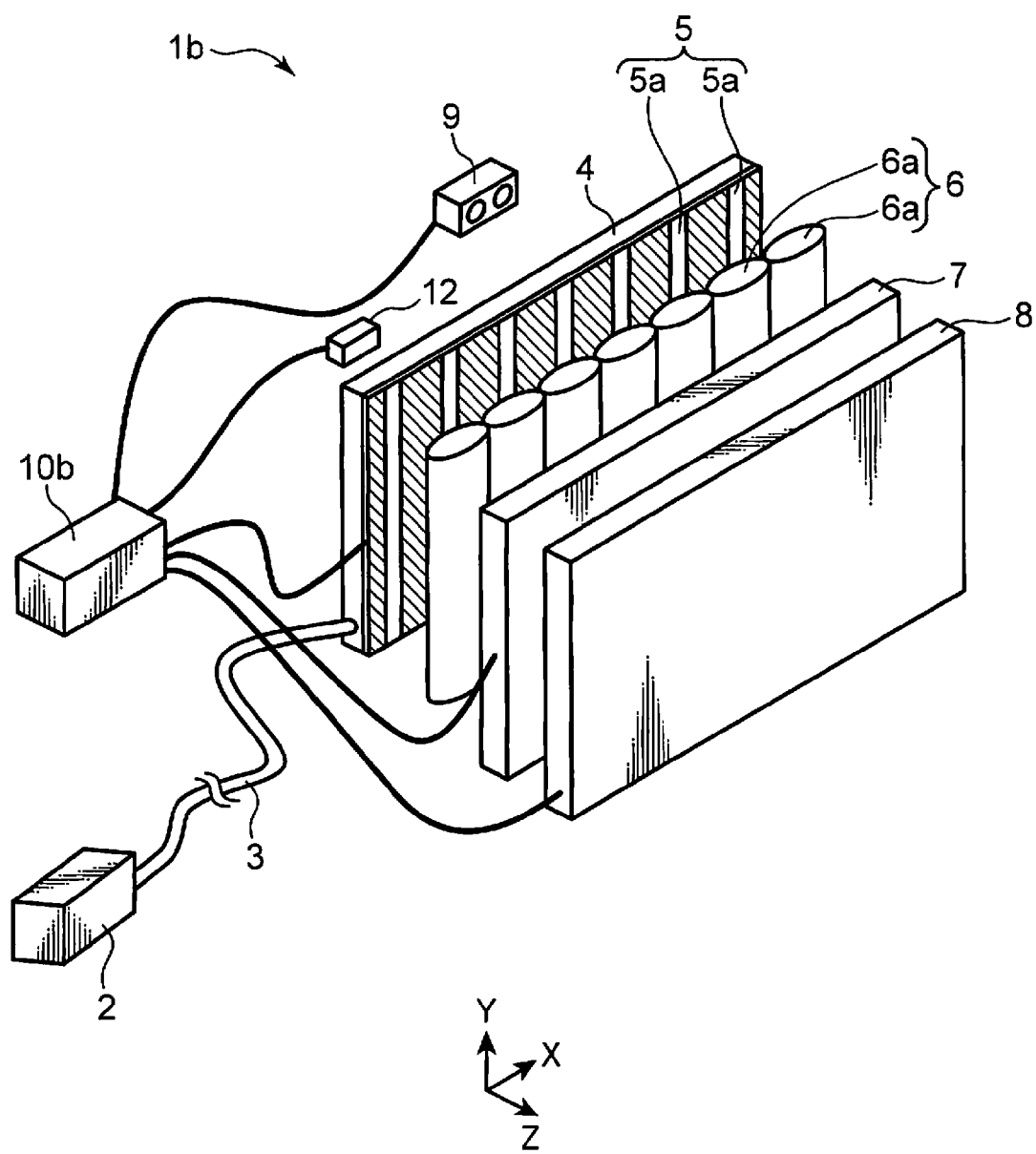
FIG. 5 is a perspective view depicting a configuration of a display device according to a further modified embodiment of the embodiment illustrated in FIG. 4.

FIG. 5 is a perspective view depicting a configuration of a display device 1b according to a further modified embodiment of the embodiment illustrated in FIG. 4. In FIG. 5, a composing element the same as FIG. 1 is denoted with a same reference symbol. The display device 1b illustrated in FIG. 5 has a controller 10b instead of the controller 10, and newly has a brightness sensor 12 in the display device 1 of Embodiment 1. The embodiment illustrated in FIG. 5 will now be described focusing on the differences from the modified embodiment in FIG. 4.

The brightness sensor 12 detects the ambient brightness of the display device 1b. Based on the detection result of the brightness sensor 12, the controller 10b estimates a degree of the opening of the pupil of the observer. The controller 10b holds, for example, a lookup table (LUT) that indicates a relationship of the detection result of the brightness sensor 12 and the diameter of the pupil of the observer. Referring to the LUT, the controller 10b extracts the diameter of the pupil corresponding to the detection result of the brightness sensor 12.

The controller 10b controls the aperture width W1 (aperture amount) of the aperture stop 5a of the aperture stop array 5, based on the distance L2 between the pupil of the observer and the lens array 6, and the diameter W2 of the pupil of the observer extracted from the LUT, using the above mentioned expression (1), for example. Therefore according to the embodiment illustrated in FIG. 5, the display device 1b, of which light use efficiency is even more improved than Embodiment 1, can be implemented, as with the embodiment illustrated in FIG. 4.

Embodiment 2

Figure 6:
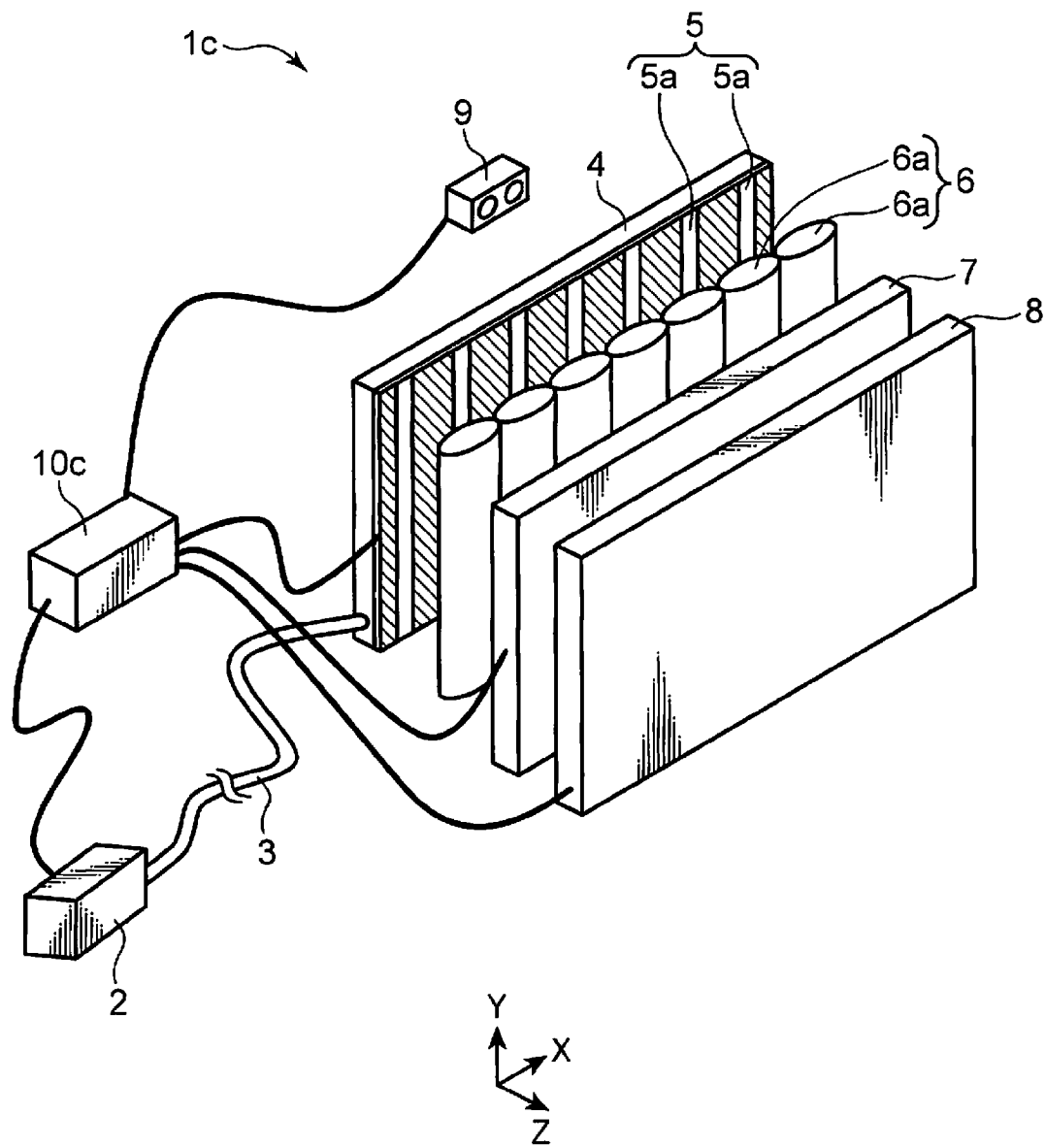
FIG. 6 is a perspective view depicting a configuration of a display device according to Embodiment 2.
Figure 7A:
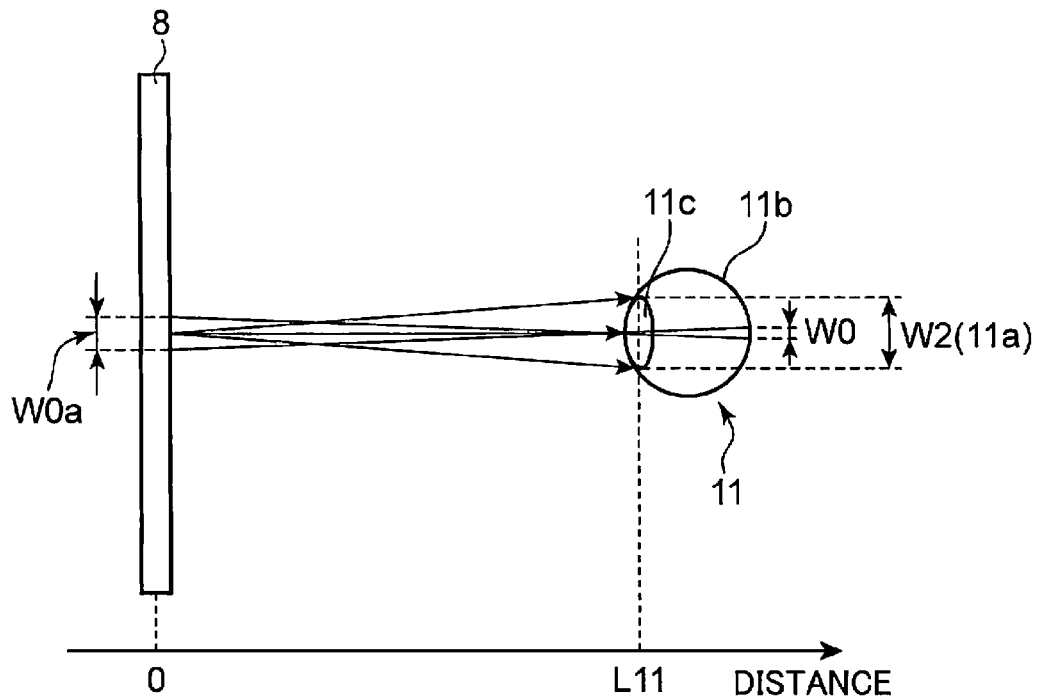
FIGS. 7A and 7B are schematic diagrams depicting a light quantity that enters a retina.
Figure 7B:
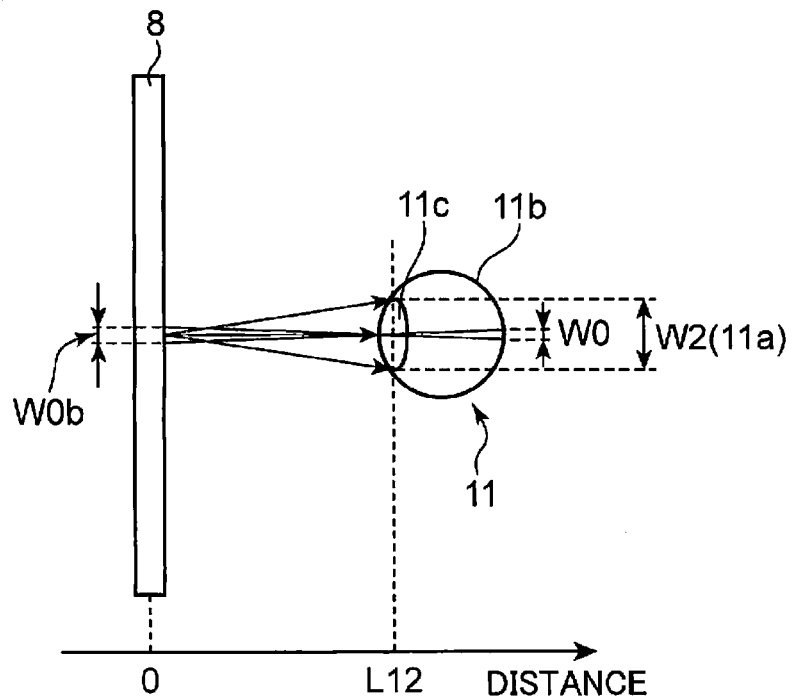

FIG. 6 is a perspective view depicting a configuration of a display device 1c according to Embodiment 2. FIGS. 7A and 7B are schematic diagrams depicting a light quantity that enters a retina. In Embodiment 2, a composing element the same as Embodiment 1 is denoted with a same reference symbol. Embodiment 2 will now be described focusing on differences from Embodiment 1.

First a light quantity that enters the retina will be described with reference to FIGS. 7A and 7B. FIG. 7A illustrates a case when the distance between an eye ball 11 of the observer and the liquid crystal panel 8 is L11, and FIG. 7B illustrates a case when the distance between the eye ball 11 of the observer and the liquid crystal panel 8 is L12. As FIG. 7A and FIG. 7B show, the relation of L11 and L12 is L11>L12.

Of the influence of light on the eyes, the influence on a retina is determined by the light energy density on the retina. When an area W0 existing on the retina 11b of the eye ball 11 is considered in FIG. 7A, an area W0a which is conjugate with the area W0 exists on the liquid crystal panel 8 via the lens (crystalline lens) 11c of the eye ball 11. In other words, the light emitted from the area W0a is focused by the lens 11c of the eye ball 11, and forms an image having the size of the area W0 on the retina 11b.

In FIG. 7B, when the same area W0 existing on a retina 11b is considered in the same way, an area W0b which is conjugate with the area W0 exists on the liquid crystal panel 8, as with FIG. 7A. However, compared with FIG. 7A, the distance between the eye ball 11 and the liquid crystal panel 8 is shorter in FIG. 7B. Hence, the area W0b is smaller than the area W0a. Accordingly, light from the area W0a and light from the area W0b, of which sizes are different depending on the distance L11 and the distance L12, on the liquid crystal panel 8, enter the area W0 of the same size on the retina 11b, in FIG. 7A and FIG. 7B.

Here, when the spread angle of the light is controlled by controlling the deflecting amount of the deflecting unit 7, as in the case of Embodiment 1, so that all the light emitted from each area W0a and W0b enters the pupil 11a of which diameter is W2, the light energy density on the retina 11b becomes higher, and accordingly, the influence on the retina 11b becomes larger in the case of FIG. 7A, compared with the case of FIG. 7B. Therefore, in Embodiment 2, the influence on the retina 11b is suppressed, as described hereinbelow.

A difference of Embodiment 2 from Embodiment 1 described above is that the controller 10c controls the diffusion angle of the laser light, and the light quantity from the laser light source 2. In FIG. 6, as with Embodiment 1, the controller 10c calculates a relative positional relationship between the pupil 11a of the observer (FIGS. 7A and 7B) and the liquid crystal panel 8 based on the detection signal of the stereo camera 9. The controller 10c controls the diffusion angle of the laser light that transmits through the liquid crystal panel 8, and the light quantity from the laser light source 2, so as to be in inverse proportion to the distance between the liquid crystal panel 8 and the observer.

In other words, when the distance L between the liquid crystal panel 8 and the pupil 11a of the observer increases and an area on the liquid crystal panel 8 that emits light to form an image in a unit area on the retina 11b becomes large, the controller 10c decreases the light quantity emitted from the liquid crystal panel 8 (that is, the light quantity from the laser light source 2) in inverse proportion to the distance L. Thereby an increase in the influence on the eye is prevented. The controller 10c also controls the deflecting amount of the deflecting unit 7, and decreases the diffusion angle of light emitted from the liquid crystal panel 8 in inverse proportion to the distance L. Thereby the light that does not enter the pupil 11a is decreased, and a drop in light use efficiency is prevented.

As described above, in Embodiment 2, the controller 10c controls the diffusion angle of the light emitted from the liquid crystal panel 8 and the light quantity from the laser light source 2. Therefore, according to Embodiment 2, the intensity of the laser light in a unit area on the retina 11b can be maintained at a constant value. Here, it is only necessary for the controller 10c to set this constant value to a reference level specified in IEC 62471 or JIS C6802 or less. As a result, according to Embodiment 2, the display device is having good efficiency conforming to the standard can be implemented. When a stereoscopic image is displayed using the display device 1c of Embodiment 2, crosstalk can be reduced.

Although the light quantity emitted from the laser light source 2 is controlled in Embodiment 2, the present invention is not limited to this. For example, the controller 10c may control the transmittance of the liquid crystal panel 8, instead of the light quantity from the laser light source 2. When the transmittance of the liquid crystal panel 8 is decreased by the controller 10c, for example, the intensity of the laser light per unit area on the retina can be reduced. Therefore in this embodiment as well, an effect similar to Embodiment 2 can be implemented.

Embodiment 3

Figure 8:
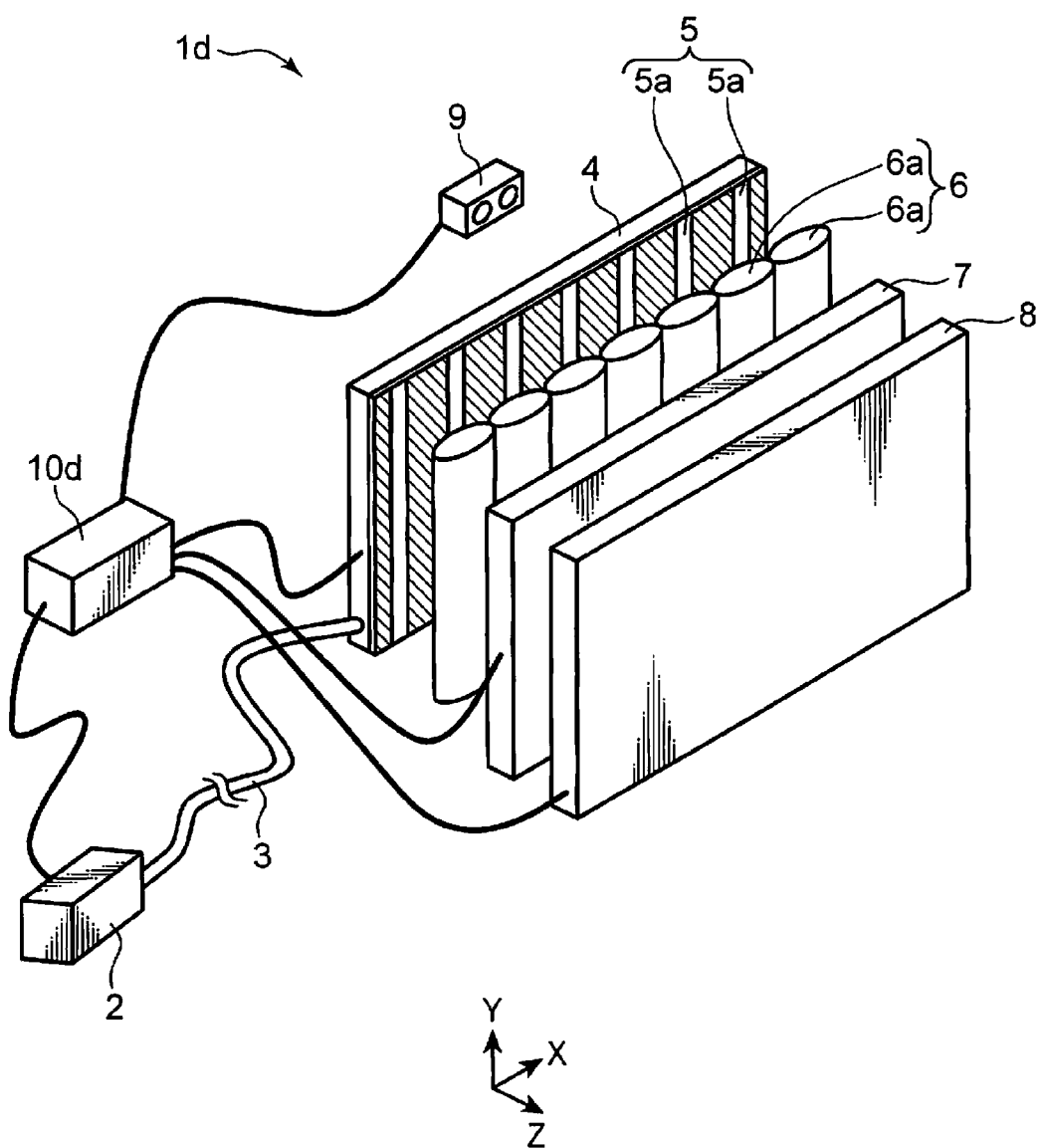
FIG. 8 is a perspective view depicting a configuration of a display device according to Embodiment 3.
Figure 9:
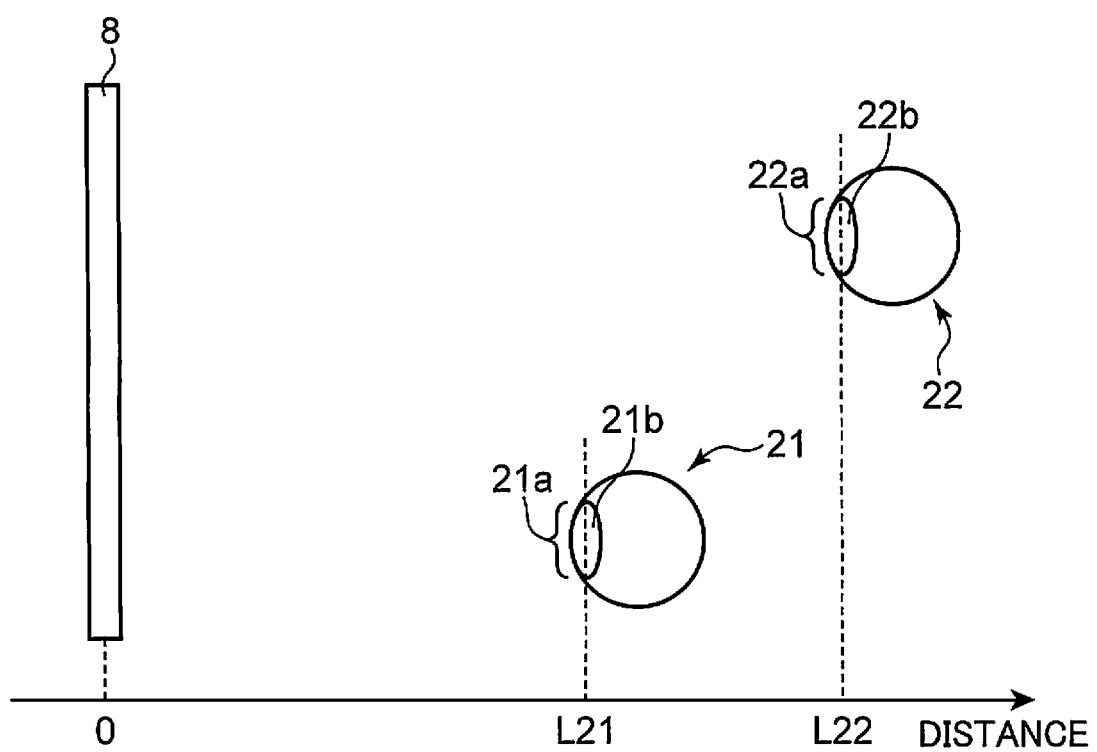
FIG. 9 is a schematic diagram depicting a relative positional relationship between two observers and the liquid crystal panel.

FIG. 8 is a perspective view depicting a display device 1d according to Embodiment 3. FIG. 9 is a schematic diagram depicting a relative positional relationship between two observers 21 and 22 and the liquid crystal panel 8. In Embodiment 3, a composing element the same as Embodiment 1 or 2 is denoted with a same reference symbol. Embodiment 3 will now be described focusing on differences from Embodiment 1 or 2.

As FIG. 9 illustrates, the distance between the center of the lens (crystalline lens) 21b of the eye ball of the observer 21 and the liquid crystal panel 8 is L21, and the distance between the center of the lens (crystalline lens) 22b of the eye ball of the observer 22 and the liquid crystal panel 8 is L22. As can be seen from FIG. 9, the relation of L21 and L22 is L21<L22, and the observer 22 is more distant from the liquid crystal panel 8 compared with the observer 21.

In FIG. 8, the controller 10*d* calculates a relative positional relationship between the pupil 21*a* of the observer 21 and the liquid crystal panel 8, and calculates a relative positional relationship between the pupil 22*a* of the observer 22 and the liquid crystal panel 8, based on the detection signal of the stereo camera 9. The controller 10*d* controls the deflecting amount of the deflecting unit 7, so that the observer 21 and the observer 22 can alternately visually recognize the image.

At this time, the controller 10*d* controls the light quantity emitted from the liquid crystal panel 8 to be in inverse proportion to the distance between the observer 21 or 22 and the liquid crystal panel 8, so that the light quantity that enters the retina of the observer 21 or 22 becomes a reference level specified by the standard or less. In other words, the controller 10*d* controls the light quantity emitted from the liquid crystal panel 8 by controlling the transmittance of the liquid crystal panel 8 or the light quantity from the laser light source 2.

Figure 10:
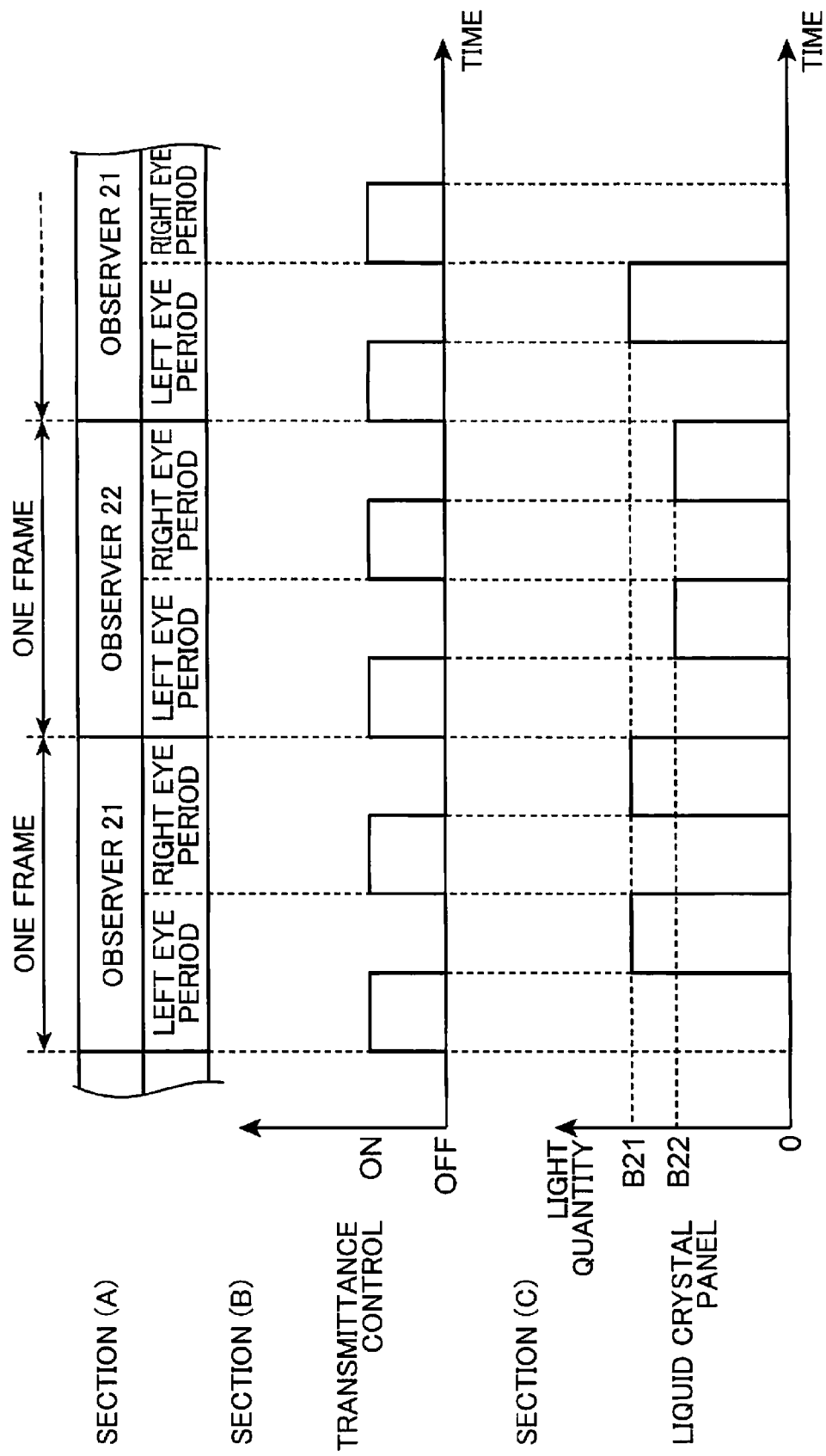
FIG. 10 is a timing chart depicting an operation of Embodiment 3.
Figure 11:
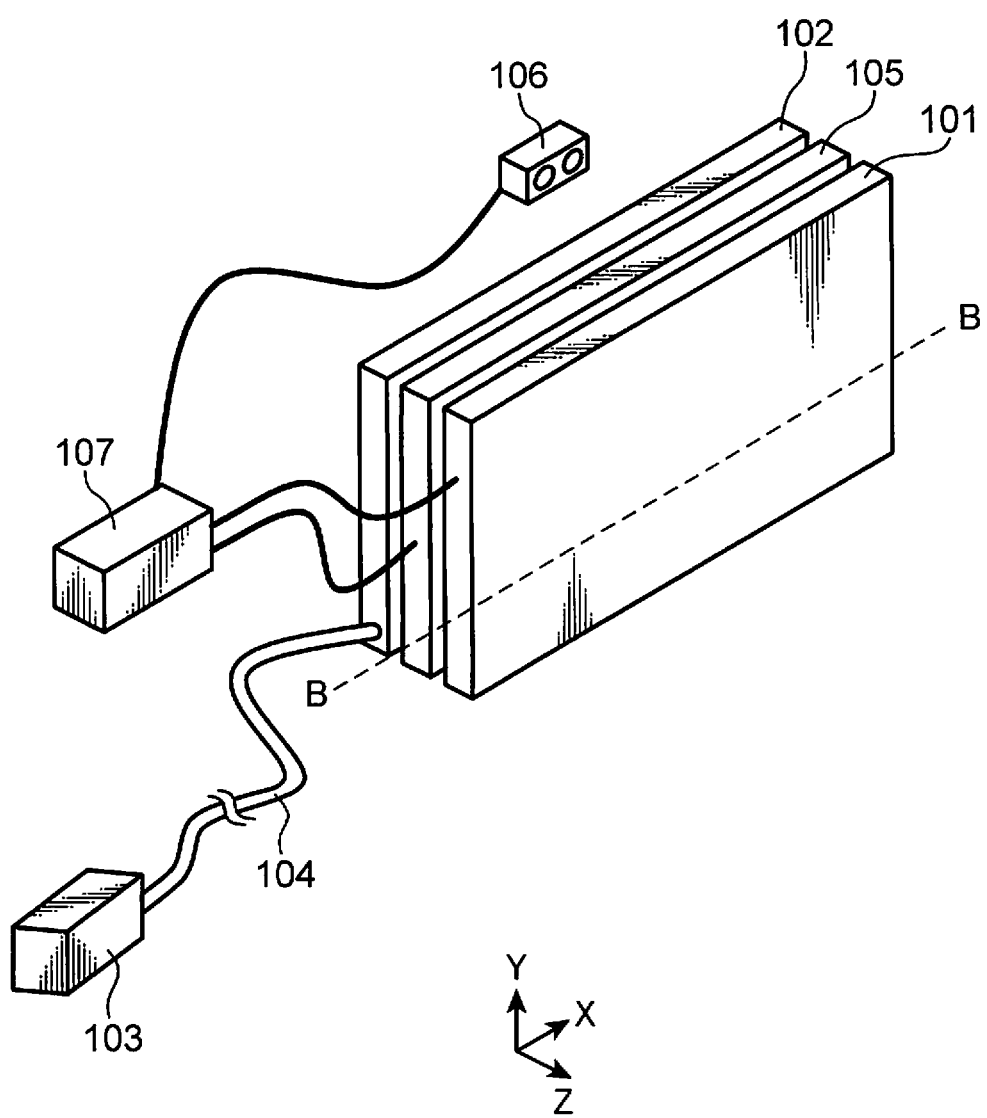
FIG. 11 is a perspective view depicting a configuration of a conventional display device.
Figure 12A:
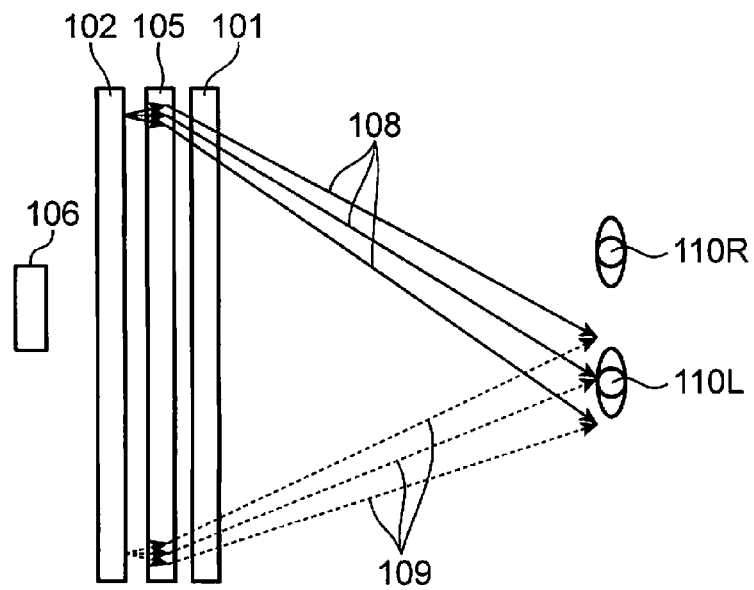
FIGS. 12A and 12B are cross-sectional views depicting the conventional display device.
Figure 12B:
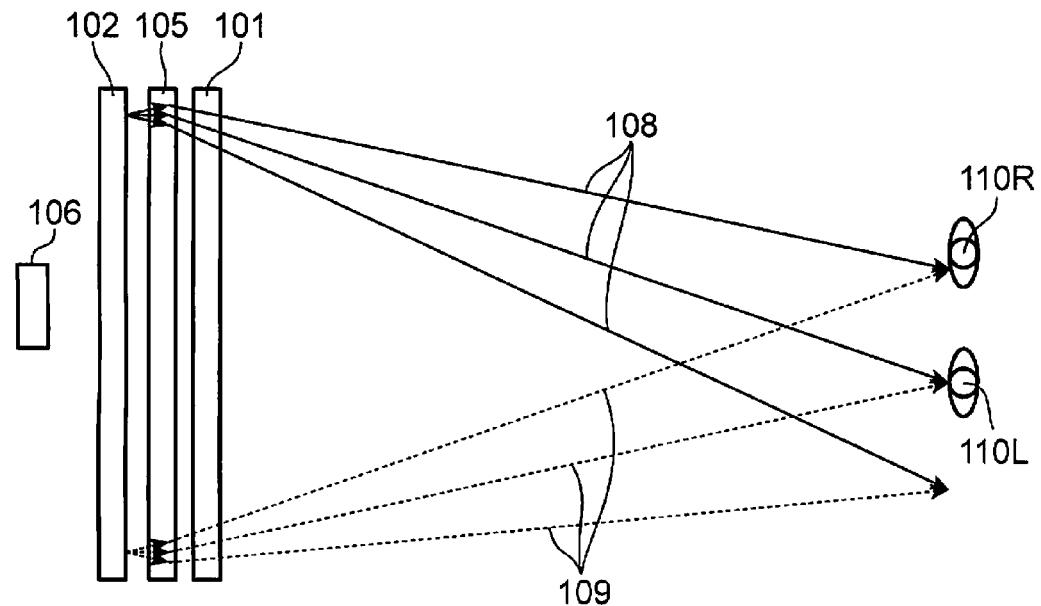

FIG. 10 is a timing chart depicting an operation of Embodiment 3. In section (A) of FIG. 10, a left eye period for displaying an image for the left eye and a right eye period for displaying an image for the right eye are shown alternately for the observer 21 and the observer 22. In section (B) of FIG. 10, a period for controlling a transmittance of the liquid crystal panel 8 is shown. In the left eye period, the controller 10*d* executes the transmittance control based on the image signal for the left eye. In the right eye period, the controller 10*d* executes the transmittance control based on the image signal for the right eye. In section (C) of FIG. 10, the light quantity emitted from the liquid crystal panel 8 is shown. The controller 10*d* causes the laser light source 2 to emit a laser light in a period after the transmittance control is completed and until the transmittance control for the next period is started.

The controller 10*d* controls the deflecting amount of the deflecting unit 7 so that the laser light is directed to the left eye of the observer 21 in the left eye period of the observer 21, and controls the deflecting amount of the deflecting unit 7 so that the laser light is directed to the right eye of the observer 21 in the right eye period of the observer 21. The controller 10*d* also controls the deflecting amount of the deflecting unit 7 so that the laser light is directed to the left eye of the observer 22 in the left eye period of the observer 22, and controls the deflecting amount of the deflecting unit 7 so that the laser light is directed to the right eye of the observer 22 in the right eye period of the observer 22.

As shown in section (C) of FIG. 10, the light quantity for the observer 21 is set to B21, and the light quantity for the observer 22 is set to B22. As can be seen from FIG. 10, the relation of B21 and B22 is B21>B22. In other words, the light quantity for the observer 22, who is more distant from the liquid crystal panel 8, is set to a lower value compared with the light quantity for the observer 21, who is closer to the liquid crystal panel 8. The light quantity B21 and the light quantity B22 are set such that the light quantity that enters the retina of the observer 21 or 22 is a reference level set by the standard or less.

In Embodiment 3, the controller 10*d* controls the light quantity emitted from the liquid crystal panel 8, so that the light quantity that enters the retinas of the observers 21 and 22 becomes a reference value specified by the standard or less respectively, in accordance with the distance between the observer 21 or 22 and the liquid crystal panel 8. Therefore, the display device 1*d*, which conforms to the standard with certainty, can be implemented for the observers 21 and 22. In Embodiment 3, both the observer 21, who is close to the liquid crystal panel 8, and the observer 22, who is distant from the liquid crystal panel 8, can visually recognize images having the same brightness. The controller 10*d* can control the light quantity from the laser light source 2 in order to control the light quantity emitted from the liquid crystal panel 8. Alternatively, the controller 10*d* may control the transmittance of the liquid crystal panel 8 in order to control the light quantity emitted from the liquid crystal panel 8.

In above-described Embodiment 3, the controller 10*d* controls the light quantity emitted from the liquid crystal panel 8 for each of the observers 21 and 22 respectively. The present invention, however, is not limited to this. The controller 10*d* may control the light quantity emitted from the liquid crystal panel 8 such that the light quantity conforms to the standard for the observer who is most distant from the liquid crystal panel 8. In other words, in section (C) of FIG. 10, the controller 10*d* may control the light quantity for the observer 21 to the light quantity B22 as well. In this embodiment as well, a display device that conforms to the standard for all the observers can be implemented. Furthermore, control by the controller 10*d* is more simplified than Embodiment 3.

In the above described embodiments, each of the display devices 1, 1*a* to 1*d* has the laser light source 2, but the present invention is not limited to this. The display device may have a light emitting diode (LED) or other light sources for example, instead of the laser light source 2. When an LED is used, it is preferable that the focusing lens is included, so that approximately parallel light enter the light guiding plate 4 by focusing the light emitted from the LED using the focusing lens.

The above described embodiments primarily include display devices having the following configurations.

A display device according to an aspect of the present invention is a display device that displays an image, comprising: a light source that emits light; an aperture stop array that includes a plurality of aperture stops which respectively limit a transmission range of the light; a lens array that includes a plurality of lenses which are disposed corresponding to the plurality of aperture stops respectively, and focus the light transmitted through the plurality of aperture stops respectively; a deflecting unit that deflects a travelling direction of the light focused by the plurality of lenses respectively; a spatial light modulator that is illuminated by the light deflected by the deflecting unit, and modulates the illumination light; a detector that detects an observer who observes the spatial light modulator; and a controller that calculates a position of a pupil of the observer based on a detection result by the detector, calculates a relative position of the display device and the pupil of the observer based on the calculation result, and controls an aperture amount of the plurality of aperture stops and a deflecting amount of the deflecting unit based on this calculation result.

According to this configuration, the transmission range of the light emitted from the light source is limited by the plurality of aperture stops of the aperture stop array respectively, and the light is focused by the plurality of lenses of the lens array. The traveling direction of the light focused by the plurality of lenses respectively is deflected by the deflecting unit. The light deflected by the deflecting unit illuminates the spatial light modulator. This illumination light is modulated by the spatial light modulator. An observer observing the spatial light modulator is detected by the detector. Based on the detection result by the detector, the position of a pupil of the observer is calculated by the controller. Based on the calculation result, a relative position of the display device and the pupil of the observer is calculated by the controller. Based on this calculation result, the aperture amount of the plurality of aperture stops and the deflecting amount of the deflecting unit are controlled by the controller. When the aperture amount of the plurality of aperture stops is appropriately controlled based on the relative position of the display device and the pupil of the observer, a drop in light use efficiency can be prevented. When the deflecting amount of the deflecting unit is appropriately controlled based on the relative position of the display device and the pupil of the observer, it becomes possible to cause the observer to visually recognize the desired image.

In this configuration, the controller may control the deflecting amount of the deflecting unit based on the calculated relative position of the display device and the pupil of the observer, so that the light modulated by the spatial light modulator enters the pupil of the observer.

According to this configuration, the deflecting amount of the deflecting unit is controlled by the controller based on the relative position of the display device and the pupil of the observer, so that the light modulated by the spatial light modulator enters the pupil of the observer. Accordingly, it is possible to cause the observer to visually recognize a desired image.

In this configuration, the controller may control the controller may control the spatial light modulator so that the light is alternately modulated based on an image signal for a left eye and an image signal for a right eye. The controller may calculate positions of the pupils of the left eye and the right eye of the observer respectively based on the detection result by the detector. The controller may calculate relative positions of the display device and the pupils of the left eye and the right eye of the observer respectively based on the calculation result. The controller may control the deflecting amount of the deflecting unit based on this calculation result, so that the light modulated by the spatial light modulator based on the image signal for the left eye enters the pupil of the left eye of the observer, and the light modulated by the spatial light modulator based on the image signal for the right eye enters the pupil of the right eye of the observer.

According to this configuration, the spatial light modulator is controlled by the controller so that the light is alternately modulated based on the image signal for the left eye and the image signal for the right eye. Based on the detection result by the detector, the positions of the pupils of the left eye and the right eye of the observer are calculated by the controller respectively. Based on the calculation result, the relative positions of the display device and the pupils of the left eye and the right eye of the observer are calculated by the controller respectively. Based on this calculation result, the deflecting amount of the deflecting unit is controlled by the controller, so that the light modulated by the spatial light modulator based on the image signal for the left eye enters the pupil of the left eye of the observer, and the light modulated by the spatial light modulator based on the image signal for the right eye enters the pupil of the right eye of the observer. Therefore, crosstalk can be suppressed.

In this configuration, the controller may control the aperture amount of the plurality of aperture stops, so that the aperture amount of an aperture stop facing a vicinity of an edge of the spatial light modulator is smaller than the aperture amount of an aperture stop facing a vicinity of a center of the spatial light modulator.

According to this configuration, the aperture amount of the plurality of aperture stops is controlled by the controller, so that the aperture amount of an aperture stop facing a vicinity of an edge of the spatial light modulator is smaller than the aperture amount of an aperture stop facing a vicinity of a center of the spatial light modulator. Compared with the distance between an aperture stop facing a vicinity of the center of the spatial light modulator and the pupil of the observer, the distance between an aperture stop facing a vicinity of the edge of the spatial light modulator and the pupil of the observer is longer. When the distance between the aperture stop and the pupil of the observer becomes long, and the distance between the lens corresponding to this aperture stop and the pupil of the observer becomes long as a result, light that does not enter the pupil increases, and light use efficiency reduces. In the above configuration, on the other hand, the aperture amount of an aperture stop facing a vicinity of an edge of the spatial light modulator is smaller than the aperture amount of an aperture stop facing a vicinity of a center of the spatial modulator. Therefore, the light quantity that does not enter the pupil of the observer, out of the light that has transmitted through the aperture stop, can be decreased. As a result, a drop in light use efficiency can be prevented.

In this configuration, the aperture amount of the aperture stop is defined as $W1$, a diameter of the pupil of the observer is defined as $W2$, a distance between the aperture stop and a lens corresponding to this aperture stop is defined as $L1$, and a distance between the lens and the pupil of the observer is defined as $L2$, and the controller may calculate the distance $L2$ based on the relative position of the display device and the pupil of the observer, and control the aperture amount $W1$ of the aperture stop so that $W1 \times L2 = W2 \times L1$ is satisfied.

According to this configuration, the distance $L2$ is calculated by the controller based on the relative position of the display device and the pupil of the observer. The aperture amount $W1$ of the aperture stop is controlled by the controller so that $W1 \times L2 = W2 \times L1$ is satisfied. Therefore, the light that has transmitted through the aperture stop enters the pupil without loss. As a result, a drop in light use efficiency can be prevented.

In this configuration, the controller may calculate a distance between the spatial light modulator and the pupil of the observer based on the relative position of the display device and the pupil of the observer, and decrease a light quantity from the light source as the calculated distance increases.

According to this configuration, a distance between the spatial light modulator and the pupil of the observer is calculated based on the relative position of the display device and the pupil of the observer. As the distance between the spatial light modulator and the pupil increases, the area of the spatial light modulator, where the light that enters the pupil is emitted, increases, and the light quantity that enters the pupil increases. Therefore an increase in the light quantity that enters the pupil can be suppressed by decreasing the light quantity from the light source as the distance between the spatial light modulator and the pupil of the observer increases.

In this configuration, the spatial light modulator may modulate light, deflected by the deflecting unit, by changing a transmittance of the spatial light modulator. The controller may calculate a distance between the spatial light modulator and the pupil of the observer based on the relative position of the display device and the pupil of the observer, and decrease the transmittance of the spatial light modulator as the calculated distance increases.

According to this configuration, the light deflected by the deflecting unit is modulated by the spatial light modulator by changing the transmittance of the spatial light modulator. Based on the relative position of the display device and the pupil of the observer, the distance between the spatial light modulator and the pupil of the observer is calculated by the controller. As the calculated distance increases, the transmittance of the spatial light modulator is decreased by the controller. Here, as the distance between the spatial light modulator and the pupil increases, an area of the spatial light modulator, where the light that enters the pupil is emitted, increases and the quantity of the light that enters the pupil increases. Since the transmittance of the spatial light modulator decreases as the distance between the spatial light modulator and the pupil increases, an increase in the light quantity that enters the pupil of the observer can be prevented.

In this configuration, the controller may calculate, when the detector detects a plurality of observers, a position of a pupil for each of the observers based on the detection result, calculate a relative position of the display device and the pupil for each of the observers based on the calculation result, and control the aperture amount of the plurality of aperture stops and the deflecting amount of the deflecting unit sequentially for each of the observers based on this calculation result.

According to this configuration, when a plurality of observers are detected by the detector, a position of a pupil is calculated for each of the observers by the controller, based on the detection result. Based on the calculation result, a relative position of the display device and the pupil is calculated for each of the observers. Based on this calculation result, the aperture amount of the plurality of aperture stops and the deflecting amount of the deflecting unit are sequentially controlled for each of the observers by the controller. When the aperture amount of the plurality of aperture stops is appropriately controlled sequentially for each of the observers based on the relative position of the display device and the pupil of the observer, a drop in light use efficiency can be prevented. Further, when the deflecting amount of the deflecting unit is appropriately controlled sequentially for each of the observers based on the relative position of the display device and the pupil of the observer, it becomes possible to cause each of the observers to visually recognize a desired image.

In this configuration, the controller may calculate a distance between the spatial light modulator and the pupil for each of the observers based on the relative position of the display device and the pupil calculated for each of the observers, and control a light quantity from the light source sequentially for each of the observers so that the light quantity from the light source decreases as the calculated distance increases.

According to this configuration, the distance between the spatial light modulator and the pupil is calculated for each of the observers by the controller, based on the relative position of the display device and the pupil calculated for each of the observers. The light quantity from the light source is sequentially controlled for each of the observers, so that the light quantity from the light source decreases as the calculated distance increases. Here, as the distance between the spatial light modulator and the pupil increases, an area of the spatial light modulator, where the light that enters the pupil is emitted, increases, and the light quantity that enters the pupil increases. Therefore, by sequentially controlling the light quantity from the light source for each of the observers so that the light quantity from the light source decreases as the distance between the spatial light modulator and the pupil increases, an increase in the light quantity that enters the pupil of each of the observers can be prevented.

In this configuration, the controller may calculate a distance between the spatial light modulator and the pupil of each of the observers based on the relative position of the display device and the pupil calculated for each of the observers, determine an observer of a maximum distance among the calculation results as a specified observer, and control a light quantity from the light source so that a light quantity that enters the pupil of the specified observer is a predetermined reference value or less.

According to this configuration, the distance between the spatial light modulator and the pupil is calculated for each of the observers by the controller based on the relative position of the display device and the pupil calculated for each of the observers. An observer of a maximum distance among the calculation result is determined as a specified observer by the controller. The light quantity from the light source is controlled by the controller, so that the light quantity that enters the pupil of the specified observer is a predetermined reference value or less. Here, as the distance between the spatial light modulator and the pupil increases, an area of the spatial light modulator, where the light that enters the pupil is emitted, increases, and the light quantity that enters the pupil increases. Therefore, by controlling the light quantity from the light source so that the light that enters the pupil of the specified observer is the reference value or less, the light quantity that enters the pupil of each of the observers can be the reference value or less.

In this configuration, the light source may be a light source that emits a laser light. According to this configuration, the light source is a laser light source that emits a laser light. Therefore a display device having a good color reproducibility can be implemented.

INDUSTRIAL APPLICABILITY

The display device according to the present invention is useful as a power saving stereoscopic image display device that can suppress crosstalk when a stereoscopic image is displayed, and can improve light use efficiency. The display device can also be used as a display device which has little negative influence on the eyes. The display device can also be used for a display device that requires extreme privacy, restricting observers who are allowed to view.

The invention claimed is:

1. A display device that displays an image, comprising:
    a light source that emits light;
    an aperture stop array that includes a plurality of aperture stops which respectively limit a transmission range of the light;
    a lens array that includes a plurality of lenses which are disposed corresponding to the plurality of aperture stops respectively, and focus the light transmitted through the plurality of aperture stops respectively;
    a deflecting unit that deflects a travelling direction of the light focused by the plurality of lenses respectively;
    a spatial light modulator that is illuminated by the light deflected by the deflecting unit, and modulates the illumination light;
    a detector that detects an observer who observes the spatial light modulator; and
    a controller that calculates a position of a pupil of the observer based on a detection result by the detector, calculates a relative position of the display device and the pupil of the observer based on the calculated position of the pupil, and changes an aperture amount of the plurality of aperture stops and a deflecting amount of the deflecting unit based on the calculated position of the pupil and the calculated relative position.

2. The display device according to claim 1, wherein the controller controls the deflecting amount of the deflecting unit based on the calculated relative position of the display device and the pupil of the observer to direct the light modulated by the spatial light modulator to the pupil of the observer.

3. A display device that displays an image, comprising:
    a light source that emits light;

an aperture stop array that includes a plurality of aperture stops which respectively limit a transmission range of the light;

a lens array that includes a plurality of lenses which are disposed corresponding to the plurality stops respectively, and focus the light transmitted through the plurality of aperture stops respectively;

a deflecting unit that deflects a travelling direction of the light focused by the plurality of lenses respectively;

a spatial light modulator that is illuminated by the light deflected by the deflecting unit, and modulates the illumination light;

a detector that detects an observer who observes the spatial light modulator; and a controller that calculates a position of a pupil of the observer based on a detection result by the detector, calculates a relative position of the display device and the pupil of the observer based on the calculated position of the pupil, and controls an aperture amount of the plurality of aperture stops and a deflecting amount of the deflecting unit based on the calculated position of the pupil and the calculated relative position, wherein:

the controller controls the deflecting amount of the deflecting unit based on the calculated relative position of the display device and the pupil of the observer to direct the light modulated by the spatial light modulator to the pupil of the observer, the controller controls the spatial light modulator so that the light is alternately modulated based on an image signal for a left eye and an image signal for a right eye, and the controller calculates positions of the pupils of the left eye and the right eye of the observer respectively based on the detection result by the detector, calculates relative positions of the display device and the pupils of the left eye and the right eye of the observer respectively based on the calculated positions of the pupils, and controls the deflecting amount of the deflecting unit based on the calculated positions of the pupils and the calculated relative positions to direct the light modulated by the spatial light modulator based on the image signal for the left eye to the pupil of the left eye of the observer, and to direct the light modulated by the spatial light modulator based on the image signal for the right eye to the pupil of the right eye of the observer.

4. A display device that displays an image, comprising:

a light source that emits light;

an aperture stop array that includes a plurality of aperture stops which respectively limit a transmission range of the light;

a lens array that includes a plurality of lenses which are disposed corresponding to the plurality of aperture stops respectively, and focus the light transmitted through the plurality of aperture stops respectively;

a deflecting unit that deflects a travelling direction of the light focused by the plurality of lenses respectively;

a spatial light modulator that is illuminated by the light deflected by the deflecting unit, and modulates the illumination light;

a detector that detects an observer who observes the spatial light modulator; and a controller that calculates a position of a pupil of the observer based on a detection result by the detector, calculates a relative position of the display device and the pupil of the observer based on the calculated position of the pupil, and controls an aperture amount of the plurality of aperture stops and a deflecting amount of the deflecting unit based on the calculated position of the pupil and the calculated relative position, wherein the controller controls the aperture amount of the plurality of aperture stops to make the aperture amount of an aperture stop facing a vicinity of an edge of the spatial light modulator smaller than the aperture amount of an aperture stop facing a vicinity of a center of the spatial light modulator.

5. A display device that displays an image, comprising:

a light source that emits light;

an aperture stop array that includes a plurality of aperture stops which respectively limit a transmission range of the light;

a lens array that includes a plurality of lenses which are disposed corresponding to the plurality stops respectively, and focus the light transmitted through the plurality of aperture stops respectively;

a deflecting unit that deflects a travelling direction of the light focused by the plurality of lenses respectively;

a spatial light modulator that is illuminated by the light deflected by the deflecting unit, and modulates the illumination light;

a detector that detects an observer who observes the spatial light modulator; and a controller that calculates a position of a pupil of the observer based on a detection result by the detector, calculates a relative position of the display device and the pupil of the observer based on the calculated position of the pupil, and controls an aperture amount of the plurality of aperture stops and a deflecting amount of the deflecting unit based on the calculated position of the pupil and the calculated relative position, wherein:

the aperture amount of the aperture stop is defined as $W1$, a diameter of the pupil of the observer is defined as $W2$, a distance between the aperture stop and a lens corresponding to the aperture stop is defined as $L1$, and a distance between the lens and the pupil of the observer is defined as $L2$, and the controller calculates the distance $L2$ based on the relative position of the display device and the pupil of the observer, and controls the aperture amount $W1$ of the aperture stop to satisfy $W1 \times L2 = W2 \times L1$.

6. The display device according to claim 1, wherein the controller calculates a distance between the spatial light modulator and the pupil of the observer based on the relative position of the display device and the pupil of the observer, and decreases a light quantity from the light source as the calculated distance increases.

7. The display device according to claim 1, wherein the spatial light modulator modulates light, deflected by the deflecting unit, by changing a transmittance of the spatial light modulator, and the controller calculates a distance between the spatial light modulator and the pupil of the observer based on the relative position of the display device and the pupil of the observer, and decreases the transmittance of the spatial light modulator as the calculated distance increases.

8. A display device that displays an image, comprising:

a light source that emits light;

an aperture stop array that includes a plurality of aperture stops which respectively limit a transmission range of the light;

a lens array that includes a plurality of lenses which are disposed corresponding to the plurality of aperture stops respectively, and focus the light transmitted through the plurality of aperture stops respectively;

a deflecting unit that deflects a travelling direction of the light focused by the plurality of lenses respectively;

a spatial light modulator that is illuminated by the light deflected by the deflecting unit, and modulates the illumination light;

a detector that detects an observer who observes the spatial light modulator; and a controller that calculates a position of a pupil of the observer based on a detection result by the detector, calculates a relative position of the display device and the pupil of the observer based on the calculated position of the pupil, and controls an aperture amount of the plurality of aperture stops and a deflecting amount of the deflecting unit based on the calculated position of the pupil and the calculated relative position, wherein the controller calculates, when the detector detects a plurality of observers, a position of a pupil for each of the observers based on the detection result, calculates a relative position of the display device and the pupil for each of the observers based on the calculated positions of the pupils, respectively, and controls the aperture amount of the plurality of aperture stops and the deflecting amount of the deflecting unit sequentially for each of the observers based on the calculated positions of the pupils and the calculated relative positions for each of the observers respectively.

9. The display device according to claim 8, wherein the controller calculates a distance between the spatial light modulator and the pupil for each of the observers based on the relative position of the display device and the pupil calculated for each of the observers, and controls a light quantity from the light source sequentially for each of the observers so that the light quantity from the light source decreases as the calculated distance increases.

10. The display device according to claim 8, wherein the controller calculates a distance between the spatial light modulator and the pupil of each of the observers based on the relative position of the display device and the pupil calculated for each of the observers, determines an observer of a maximum distance among the calculation results as a specified observer, and controls a light quantity from the light source so that a light quantity that enters the pupil of the specified observer is a predetermined reference value or less.

11. The display device according to claim 1, wherein the light source is a laser light source that emits a laser light.

* * * * *